US007054938B2

(12) United States Patent
Sundqvist et al.

(10) Patent No.: US 7,054,938 B2
(45) Date of Patent: May 30, 2006

(54) METHOD AND APPARATUS FOR NETWORK SERVICE RESERVATIONS OVER WIRELESS ACCESS NETWORKS

(75) Inventors: Jim Sundqvist, Luleå (SE); Hans Hannu, Luleå (SE); Bogdan Timus, Luleå (SE); Joakim Norrgåard, Luleå (SE); Olov Schelén, Norrfjä (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 797 days.

(21) Appl. No.: 09/778,004

(22) Filed: Feb. 7, 2001

(65) Prior Publication Data

US 2001/0032262 A1 Oct. 18, 2001

Related U.S. Application Data

(60) Provisional application No. 60/181,547, filed on Feb. 10, 2000.

(51) Int. Cl.
*G06F 15/16* (2006.01)

(52) U.S. Cl. ............... 709/227; 709/223; 709/240; 370/235

(58) Field of Classification Search ............ 709/223, 709/227, 240; 340/2.1; 370/235, 236
See application file for complete search history.

(56) References Cited

U.S. PATENT DOCUMENTS

| 5,329,619 | A | 7/1994 | Pagé et al. |
| 5,341,477 | A | 8/1994 | Pitkin et al. |
| 5,623,422 | A | 4/1997 | Williams |
| 5,654,959 | A | 8/1997 | Baker et al. |
| 5,812,768 | A | 9/1998 | Pagé et al. |
| 5,845,091 | A | 12/1998 | Dunne et al. |
| 5,912,885 | A | 6/1999 | Mitts et al. |
| 6,021,263 | A * | 2/2000 | Kujoory et al. .............. 709/232 |
| 6,058,113 | A * | 5/2000 | Chang ........................ 370/390 |
| 6,094,431 | A * | 7/2000 | Yamato et al. .......... 370/395.21 |
| 6,314,464 | B1 * | 11/2001 | Murata et al. .............. 709/226 |
| 6,330,236 | B1 * | 12/2001 | Ofek et al. .................. 370/369 |
| 6,336,129 | B1 * | 1/2002 | Ise et al. .................... 709/201 |
| 6,347,091 | B1 * | 2/2002 | Wallentin et al. ........... 370/437 |
| 6,356,565 | B1 * | 3/2002 | Bouyer et al. .............. 370/468 |
| 6,374,112 | B1 * | 4/2002 | Widegren et al. ......... 455/452.2 |

(Continued)

FOREIGN PATENT DOCUMENTS

WO 98/29975 7/1998

(Continued)

OTHER PUBLICATIONS

Schelen O. et al., "Performance of QoS agents for provisioning network resources", 1999 Seventh International Workshop on Quality of Service, May 31-Jun. 4, 1999, pp. 17-26.

(Continued)

*Primary Examiner*—Andrew Caldwell
*Assistant Examiner*—Stephan Willett

(57) ABSTRACT

Methods and apparatus are provided for reserving resources in a wireline network from a wireless network. A resource reservation request is made by a service client to a service broker. The service broker contacts a bandwidth broker to determine the available resources in the wireline network. The service broker also contacts a geographical domain server for information related to wireless access for the requested reservation. Using information provided by the geographical domain server, the service broker contacts a radio bearer broker to determine the resources available in a particular wireless network. Based upon the information provided by bandwidth brokers and radio bearer brokers, the service client can reserve the requested resources.

26 Claims, 5 Drawing Sheets

U.S. PATENT DOCUMENTS

| | | | |
|---|---|---|---|
| 6,434,624 B1* | 8/2002 | Gai et al. | 709/232 |
| 6,453,349 B1* | 9/2002 | Kano et al. | 709/226 |
| 6,496,479 B1* | 12/2002 | Shionozaki | 370/230 |
| 6,516,192 B1* | 2/2003 | Spaur et al. | 455/450 |
| 6,519,254 B1* | 2/2003 | Chuah et al. | 370/389 |
| 6,563,793 B1* | 5/2003 | Golden et al. | 370/236 |
| 6,570,883 B1* | 5/2003 | Wong | 370/412 |
| 6,614,790 B1* | 9/2003 | Veres et al. | 370/395.2 |
| 6,628,629 B1* | 9/2003 | Jorgensen | 370/322 |
| 6,647,419 B1* | 11/2003 | Mogul | 709/226 |
| 6,678,248 B1* | 1/2004 | Haddock et al. | 370/235 |
| 6,690,647 B1* | 2/2004 | Tang et al. | 370/235 |
| 6,708,209 B1* | 3/2004 | Ebata et al. | 709/223 |
| 6,714,517 B1* | 3/2004 | Fawaz et al. | 370/236 |
| 6,721,272 B1* | 4/2004 | Parnafes et al. | 370/235 |
| 6,728,365 B1* | 4/2004 | Li et al. | 379/329 |

FOREIGN PATENT DOCUMENTS

| | | |
|---|---|---|
| WO | 99/05828 | 2/1999 |
| WO | 99/52307 | 10/1999 |

OTHER PUBLICATIONS

Lawson Stephen, "Bandwidth Broker to Automate Carrier-Capacity Deals," Oct. 15, 1999, InfoWorld Electric.

Soh, W-S. et al., "Dynamic Bandwidth Reservation in Hierarchical Wireless ATM Networks Using GPS-Based Prediction," VTC 1999, Fall. IEEE VTS 50th, Vehicular Technology Conference, Amsterdam, Sep. 19-22, 1999, IEEE Vehicular Technology Conference, New York, NY, IEEE, U.S., vol. 1, Conf. 50, pp. 528-532.

Toh, Chai-Keong, "Associativity-Based Routing for *Ad-Hoc* Mobile Networks,"Wireless Personal Communications 4:103-139, 1997, University of Cambridge, Computer Laboratory, Cambridge CB2 3QG, United Kingdom.

Takahashi, Eiji et al., "Bandwith Allocation with Auction Approach," The Institute of Electronics, Information and Communication Engineers, Techincal Report of IEICE, pp. 25-30.

Semret, N. et al., "Market Pricing of Differentiated Internet Services," 1999 Seventh International Workshop on Quality of Service, 1999, pp. 184-193.

Hol, K., "Bit by Bit by Bit: Demand and Supply of Bandwidth Through Electronic Auctions" Abstract No. 6392644, British Telecommuniciations Engineering Conference, vol. 18.

* cited by examiner

METHOD AND APPARATUS FOR NETWORK SERVICE RESERVATIONS OVER WIRELESS ACCESS NETWORKS

The present application claims priority under 35 U.S.C. §119(e) to U.S. Provisional Application No. 60/181,547 filed on Feb. 10, 2000, the entire disclosure of which is herein expressly incorporated by reference.

BACKGROUND

The present invention relates to quality of service control in networks, and more specifically, to providing a certain level of quality of service in a network which includes both wireless and wire line infrastructure through reservation of resources.

Conventionally, the Internet has not provided mechanisms for differentiation of the quality of service of various traffic routed over the Internet. Accordingly, all packets which traverse the Internet are treated equally when being forwarded by routers in the Internet. However, recently there has been a demand for quality of service differentiation in packets traversing the Internet. This demand for quality of service differentiation is due in part to applications being used across the Internet with various demands for high throughput and low delay. Further, users of the Internet have shown an increased willingness to pay for improved quality of service for traffic on the Internet.

To address the demand for differentiation of quality of service in the Internet, the Internet Engineering Task Force (IETF) has proposed one mechanism which is known as Integrated Services Architecture and which uses RSVP. The mechanism is based on soft end-to-end signaling to provide sensitive applications with admission control and per flow quality of service in routers along data paths. However, this approach has been dismissed as too complex due to the fact that the original design of the Internet is stateless in that the routers do not need any information about application data flows in order to route the data. Adding per flow connection state in routers changes this model of the Internet router so that it does not scale as well into the original design of the Internet.

Another approach to providing differentiated services over the Internet by the IETF is known as the diffserv architecture. In the diffserv architecture, IP packet headers include a small label, known as the diffserv field, to identify the forwarding treatment that particular packet should be provided by routers. Core routers are configured with a few per-hop behaviors which are matched to the packet labels so that these routers can forward packets in accordance with a priority of their forwarding class. The diffserv architecture relies on the use of traffic conditioners, including packet markers, traffic shapers and policing functions, at the boundaries of the network to ensure that the traffic load is controlled and that intended services are provided in the various forwarding classes.

One known method for controlling a minimum quality of service in a network is through admission control. Admission control allows a network operator to reject service to new clients so that committed service can be provided to clients that were already granted admission. One method for admission control in the diffserv architecture is through the use of boundary routers and policy servers. FIG. 1 illustrates a conventional policy server architecture for admission control to a network. The architecture illustrated in FIG. 1 includes a client 110, access router 120, including a policy enforcement point 125, a policy server 130, including a policy decision point 135, and a network 140. To gain access to network 140, client 110 sends its request for access to access router 120. Policy enforcement point 125 in access router 120 forwards the request for admission to policy server 130. The policy decision point 135 in policy server 130 determines whether to allow client 110 access to network 140. Policy server 130 returns this decision to access router 120, which in turn, either allows or denies client 110 access to network 140. The decision of whether to allow or deny access to network 140 by policy server 130 is not based upon the available resources of network 140, but instead is based upon policy decisions such as whether client 110 has a right to reserve access in network 140, e.g., whether client 110 is a paying customer of network 140.

FIG. 2 illustrates another conventional admission control architecture. The admission control architecture illustrated in FIG. 2 includes client 210, access router 250, including traffic classifier/traffic shaper 255, bandwidth broker (BB) 260 and network 240. To gain admission to network 240, client 210 sends a request to access router 250. Access router 250 forwards the request for bandwidth to bandwidth broker 260. Bandwidth broker 260 determines whether there is enough bandwidth in network 240 to grant the request of client 210. Bandwidth broker 260 forwards this decision to access router 250, which then allows or denies client 210 the reserved access to network 240. If client 210 is granted access to network 240, traffic from client 210 is shaped by the traffic classifier/traffic shaper 255 located in access router 250.

It will be recognized that there are two general types of bandwidth reservation which a bandwidth broker typically deals with, open ended immediate reservation and in advance reservations. An open ended immediate reservation is a reservation that is made for the present time and does not have a deterministic end time. This type of reservation is provided only with a limited guarantee for bandwidth in a network. The services with immediate reservation have lower priority than the services with in advance reservation in the sense that a service with immediate reservation may be preempted in case resources have to be reallocated to a service with in advance reserved resources. This risk of preemption is viewed as an acceptable tradeoff against the target of maximum utilization for reserved resources. Accordingly, this risk of preemption is configured to an acceptable level.

An in advance reservation is a reservation for a future point in time which is guaranteed for the duration of the reservation. By offering in advance reservations, clients can more effectively plan their network activities. In advance reservations are typically used for scheduled events and when long term aggregate resources are negotiated between different providers.

To provide committed service in their domains, bandwidth brokers set up traffic conditioners in boundary routers of their diffserv domains. Traffic conditioners perform packet marketing, policing and traffic shaping. Thus, traffic conditioners are used to ensure that the clients maintain their bandwidth within the amount that they reserved and that the intended services are provided in the various forwarding classes. Traffic in excess of a reservation is either dropped or remarked to a lower service level.

As the Internet continues to evolve, it is anticipated that wireless access to the Internet will continue to increase. It is envisioned that Internet protocol (IP) will one day be used end-to-end, including over wireless links, so that mobile units can be provided with the opportunity to support a vast range of applications in traffic mixes.

In the current wired Internet, and in IP-based wireless local area networks (WLANs) congestion in the network can result in increased delays to packets traversing the network and to dropped packets. However, since the bandwidth of these networks is quite large, and the transmission speed of data through these networks is also quite quick, these network delays and dropped packets are not viewed as a great problem. However, in wide area wireless networks, i.e., networks which operate in government license bands where end users typically pay a traffic fee per minute for use of the network, e.g., WCDMA or GSM, bandwidth is quite expensive. Accordingly, it would be a waste of this precious bandwidth if packets which have entered the network over a wireless link are dropped in the wired backbone. Accordingly, it would be desirable to provide a sufficient amount of resources in the backbone network for carrying the expensive wireless traffic.

Although there are known mechanisms in network elements to enforce resource provisioning such that per packet service differentiation is provided, there is currently a lack of resource management mechanisms for anticipating the amount of traffic that needs to be provided with better service and for provisioning the network resources for this. Resource management mechanisms for wireless service needs to anticipate a greater number of factors than resource management mechanisms for wireline service. These factors include the geographic location from which access will occur, the type of access technology to be used for the access and the mobility during the particular wireless access.

FIG. 3 illustrates the geographical location problem of wireless reservation access. Assume that a client at time and space location A wishes to make a service reservation, i.e., to reserve network resources. Since the client has wireless access, the client may be mobile, and may be reserving access at time and space point A for a different location in the future time at time and space point B. Accordingly, it would be desirable to provide mechanisms in wireless reservation to account for reservations systems which are made in a particular geographic location for a connection at another geographical location.

Access technology can be divided into two major categories based primarily upon the area of coverage provided by the access technology, local area wireless networks and wide area wireless networks. Access technologies which can be classified as local area wireless networks include Bluetooth and wireless local access networks (WLAN). Bluetooth networks operate in the 2.4 GHz frequency band and are intended to remove the requirement of cables between various devices. Bluetooth networks typically have nominal range of 10 cm to 10 m and a gross data rate of 1 Mpbs. WLAN networks can operate in the 2.4 GHz frequency band and can be used to provide laptop computer users with mobility without compromising the performance or security provided by wired LANs. It is anticipated that the 5.2 GHz band will be opened to be dedicated to WLAN like applications. WLANs operating in the 2.4 GHz frequency band have a nominal operating range around 400–500 m and a gross data rage of approximately 3 Mpbs. WLANs operating in the 5.2 GHz range have a nominal operating range of 30–200 m and a gross data rage of approximately 20 Mbps. It should be noted that the 2.4 GHz frequency band used by both Bluetooth and WLANs is an unlicensed frequency band, i.e., devices operating in this frequency band do not require licenses from government entities. Accordingly, the amount of time spent communicating in this frequency band is comparatively cheaper than the same amount of time spent communicating over a frequency band which requires licenses.

Access technologies which can be classified as wide area wireless networks include conventional networks referred to generally as cellular networks, e.g., Global System for Mobile Communication (GSM) networks, General Packet Radio Services (GPRS)/Enhanced Data for GSM Evolution (EDGE) networks and Universal Mobile Telecommunication Systems (UMTS) networks. The access technologies generally provide services up to 20 km from a base station and operate over licensed frequency bands. The gross bit rate provided in GSM networks is a maximum of 14.4 kbps, the gross bit rate in a GPRS network can vary between 10–120 kbps and a GPRS with the EDGE extension can provide up to 384 kbps. In a UMTS network there is a maximum bit rate of 2 Mbps, but most of the time the maximum bit rate will be around 384 kbps for wide area coverage.

The mobility of a user refers to the amount of movement of a particular user. A high mobility user, i.e., a user with a large amount of movement, cannot use a local area wireless network, but instead must select a wide area wireless network. In addition, a high mobility user which communicates in a wide area wireless network may move between cells supported by different base stations. Switching between these different base stations is known as handover. Accordingly, a reservation scheme for wireless users should account for the possibility that a user may handover between various portions of the wireless network.

Accordingly, it would be desirable to provide a reservation system for wireless networks for transporting information over wired networks.

It would also be desirable to provide a reservation system which is scalable within the Internet architecture.

Further, it would be desirable to provide a reservation system which allows for both immediate reservations and in advance reservations.

It would also be desirable to provide a reservation system which accounts for the actual geographic area for which the reserved communication is to take place. In addition, it would be desirable to provide a reservation system which accounts for the advantages and limitations of various access technologies. It would also be desirable to provide a reservation system which accounts for the mobility of a user.

SUMMARY

These and other problems, drawbacks and limitations of conventional techniques are overcome according to the present invention by a method and apparatus for reserving resources in a wireline network from a wireless network. A resource reservation request is made by a service client to a service broker. The service broker contacts a bandwidth broker to determine the available resources in the wireline network. The service broker also contacts a geographical domain server for information related to wireless access for the requested reservation. Using information provided by the geographical domain server, the service broker contacts one or more radio bearer brokers to determine the resources available in a particular wireless network. Based upon the information provided by bandwidth brokers and radio bearer brokers, the service broker can reserve the requested resources for the service client or can deny the service to the service client when resources are not available.

BRIEF DESCRIPTION OF THE DRAWINGS

The objects and advantages of the invention will be understood by reading the following detailed description in conjunction with the drawings, in which.

DETAILED DESCRIPTION

Figure 1:
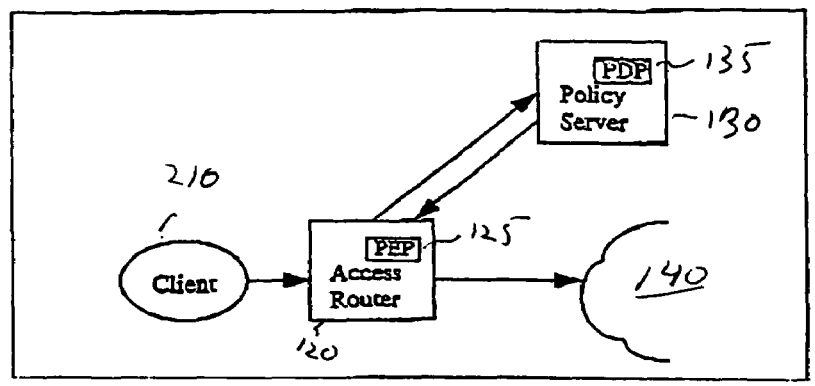
FIG. 1 illustrates a conventional network which uses a policy server for admission control to a network.
Figure 2:
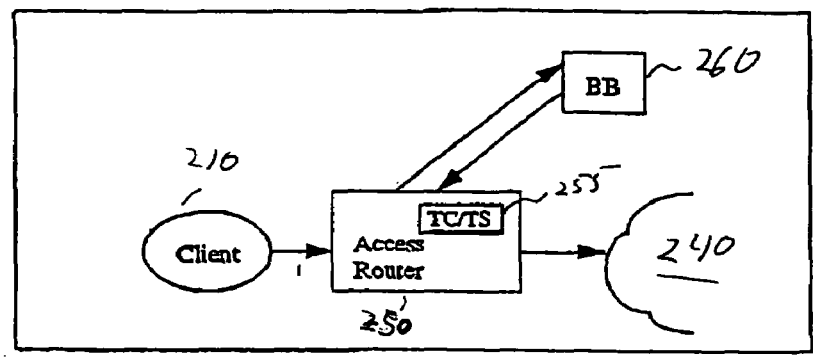
FIG. 2 illustrates a conventional network which uses a bandwidth broker for admission control to a network.
Figure 3:
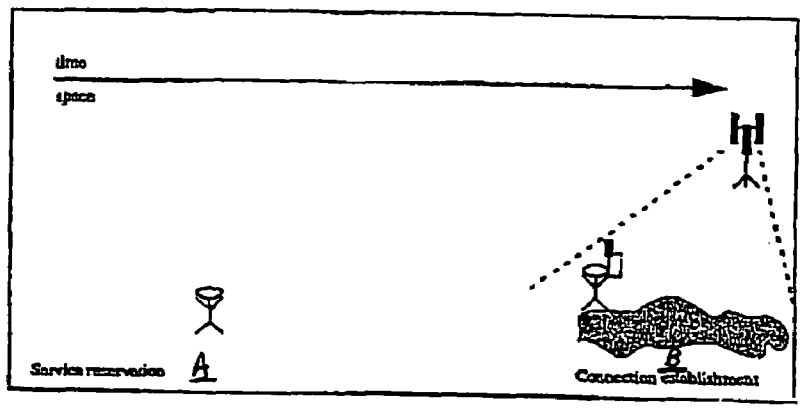
FIG. 3 illustrates an in advance reservation for a communication session which is to occur at a different time and location.

The various features of the invention will now be described with reference to the figures, in which like parts are identified with the same reference characters.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention.

Exemplary embodiments of the present invention use internetworking between various types of networks and employs IP end-to-end over all link technologies. The system includes end-to-end resource management over wired and wireless link technologies and supports both immediate service and in advance service reservations. The service reservations are made to support service between two or more terminals which can be fixed and/or wireless.

Figure 4:
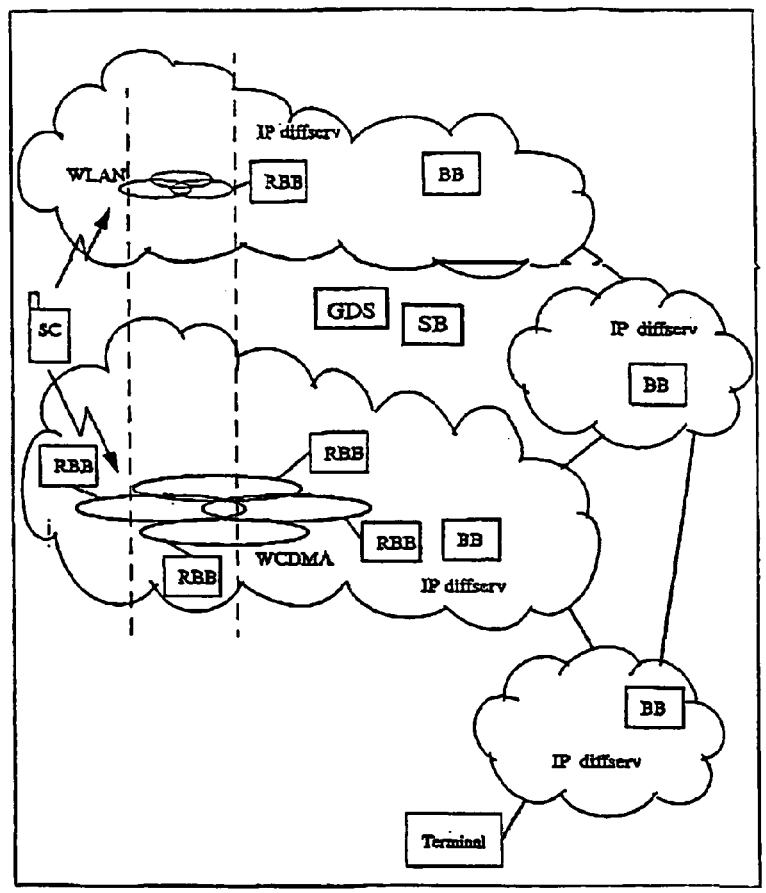
FIG. 4 illustrates an exemplary network for implementation of the present invention.

FIG. 4 illustrates an exemplary network for implementation of the present invention. The network illustrated in FIG. 4 includes a WLAN domain, including three wireless cells, which includes a radio bearer broker (RBB) and a bandwidth broker, a wideband CDMA (WCDMA) domain including a bandwidth broker and four cells each cell including a radio bearer brokers, two fixed network technology domains each of which include a bandwidth broker, a geographic domain server (GDS), a service broker (SB), a service client (SC) and a terminal. The vertical dashed lines in FIG. 4 illustrate that the three cells in the WLAN system cover the same area as the four cells of the WCDMA system.

As illustrated in FIG. 4, each radio access node or network includes a radio bearer broker. The radio bearer broker performs resource management and admission control for the associated access node or access network. Each Internet routing domain includes a bandwidth broker. The bandwidth broker manages resources and performs admission control in its routing domain. The bandwidth broker also interacts with the radio bearer broker to handle Internet resource reservations for a wireless link.

The service broker provides wireless service for a specific geographical area by identifying the most suitable access technology, out of all possible access technologies, to provide the requested service. After identifying the most suitable access technology based upon a specific geographic area the service broker communicates with the bandwidth broker and the radio bearer broker to allocate the resources required for the requested end-to-end service. The client using the reservation is referred to as the service client. The service client need not be the same client which makes the reservations. For example, in the network illustrated in FIG. 4 the terminal can make the reservation for a communication session for the service client to use.

Now that a brief overview of a network which implements the present invention has been described, a more detailed explanation of the various elements of the network is presented below.

Radio Bearer Broker

Figure 5:
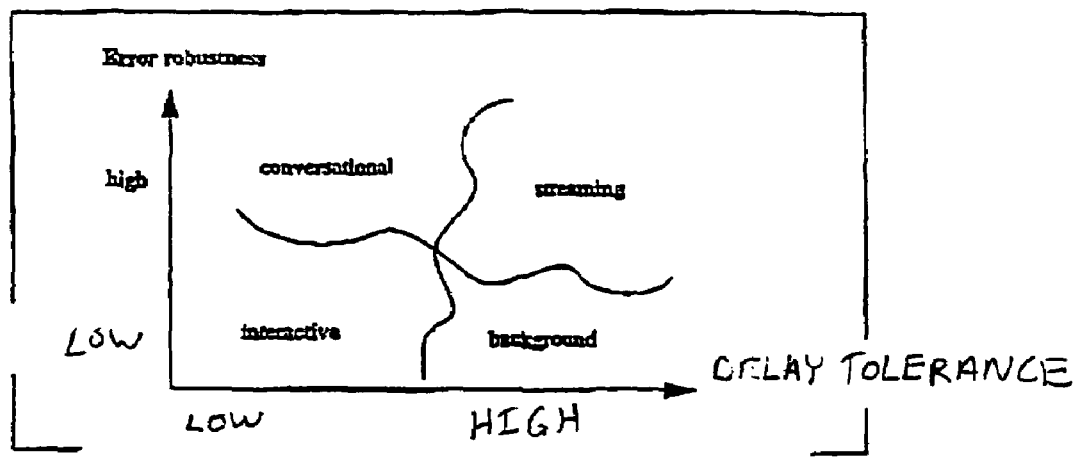
FIG. 5 illustrates the error robustness and tolerance for delay for various services in accordance with exemplary embodiments of the present invention.

The implementation of the radio bearer broker is dependent on the access technology of the network associated with the radio bearer broker. However, following the functionality of the radio bearer broker outlined below will allow one skilled in the art to implement a radio bearer broker in any type of access technology. To ensure that the most efficient use of the radio resource the radio bearer broker should account for the service requirements of the various types of traffic to be communicated over the radio interface. In the third generation wireless standard known as 3GPP, there are four service classes defined, conversational, streaming, interactive and background. As illustrated in FIG. 5, the main differences between these service classes is their tolerance for delay and their error robustness.

Conversational services include telephony and video conferencing. As illustrated in FIG. 5 these services have a high error robustness but a low tolerance for delay. For example, the maximum acceptable one way ear to mouth delay in telephony is typically considered to be 150 ms. Streaming service are similar to conversational service in that they may use the same type of audio and video codecs. However, streaming services are typically asymmetrical and have a high tolerance for delay. Interactive services include services such as web surfing where there is a low tolerance for delay and a low error robustness. Background services are asymmetrical services where there is a large amount of traffic in one direction. These services typically have a high tolerance for delay and a low error robustness.

For each class of service the radio bearer broker should set approximately ten attributes. These attributes can include, but are not limited to, transfer delay, service data unit error ratio, residual bit error ratio and delivery of erroneous service data units.

The radio bearer broker can be implemented in both circuit switched and packet switched networks. In a circuit switched time division multiple access (TDMA) system the radio bearer broker reserves one or more time slots for the requested service. In a circuit switched code division multiple access (CDMA) system the radio bearer broker can reserve one or more codewords for the requested service.

According to exemplary embodiments of the present invention, the radio bearer broker in a wide area wireless network is placed directly in the access point, i.e., the base station. This allows the radio bearer broker to easily retrieve information regarding the available resources. Alternatively, the radio bearer broker can be placed in another unit in the wireless system such that it supervises more than one cell. For example, in a WLAN network, it is most efficient to use one radio bearer broker for the entire network. It should be recognized that in some systems the use of one radio bearer broker for the entire network can result in reservations over a large area which results in expensive signaling traversing the network. Further, in a UMTS system the radio bearer broker can be implemented in a radio network controller (RNC). A radio network controller typically provides radio resource management, e.g., session admission control at the radio level, in UMTS systems.

In order to reserve resources in the wireless network, the radio bearer broker should have information about the resources of the network. For example, the radio bearer broker should have information regarding the configuration parameters, characteristics of a radio environment, e.g., distance attenuation and fading characteristics, for an area of the wireless network to be reserved, geographical coverage of the network, the performance of the network in terms of available channels, e.g., delays and bit error probabilities, current level of reservations in the network, the level of mobility supported by the network and the historical data about the traffic load of the network.

The mobility of the service client defines the size and geometrical area to be reserved for the service client. For example, a low mobility user can be modeled as a disc around the point where the user is most likely to be located. The area for a high mobility user may be modeled based upon, for example, a highway. Accordingly, an intuitive interface should be presented to the service client to collect the primary information and translate it into geographic information for use by the system.

It will be recognized that the historical data about the traffic load in the network can determined by collecting information over a predetermined amount. Alternatively, the historical data about the traffic load in the network can be approximated based upon typical traffic data. For example, it is known that in wide area wireless network there is heavy traffic in the morning and evening when people are traveling to and from work and during lunch time. Similarly, in fixed networks there is a large amount of traffic during the morning when employees are reading and responding to electronic mail and a lower amount of traffic during lunch time.

Bandwidth Broker

Referring again to FIG. 4, the present invention implements bandwidth brokers in the Internet backbone. By placing the bandwidth broker in the Internet backbone the bandwidth broker can combine the service requirements for both planned virtual leased line services between specified access points or access networks along with the service requirements for unplanned wireless access. To combine these service requirements the bandwidth broker must provision network resources over time so that primary service can be offered at reasonable levels of utilization at all times.

One aspect of virtual leased lines and wireless access networks which allows for the provisioning of network resources over time is predictability. For virtual leased lines the predictability is due to the fact that the access points are specified so that the path can be predicated for each virtual leased line and that virtual leased line traffic goes through admission control over time. The predictability in wide area wireless networks is due to the limited bandwidth and admission control such that the overall bandwidth used in the Internet backbone for this traffic is relatively small. Additional predictability in wide area wireless networks can be achieved through usage based pricing in the networks. Even though the access points are mobile and specific source and destination points in a wide area wireless network are unknown, the traffic patterns in the backbone can be roughly estimated over time.

In accordance with the present invention the bandwidth broker operates in two modes, heuristic mode and immediate admission mode. In heuristic mode the bandwidth broker is not concerned with the use of immediate traffic measurements for admission control. Instead traffic measurements of are used to build a heuristic load map over times of the day and days of the week. To obtain these traffic measurements a specific code point is used for traffic which enters the network via the wide area wireless network. The specific code point allows routers in the backbone to identify wireless traffic. By identifying wireless traffic the routers can monitor the load on the network due to the wireless traffic. This load can be periodically reported to the bandwidth broker which uses the reported information to build the heuristic map of wireless traffic patterns. It will be recognized that the period in which the load is reported from the routers to the bandwidth broker can be selected in accordance with low real-time requirements of the network to ensure low overhead and scalability.

Assuming that the traffic patterns over the time of specific weekdays is fairly constant, the bandwidth broker uses the heuristic load map to determine conservative admission control for network resources in the future. The remaining resources are made available for future reservations for virtual leased line services. To achieve this, a bandwidth broker maintains information about per-link resource reservations over time. This ensures that the variation over different geographical areas are encountered.

In immediate admission mode wireless units send admission control requests for each specific resource demand, i.e., for each call. Immediate admission mode should be used when resources in the network are scarce and the cost of additional signaling indicates that better control of network resources are needed. As utilization is continuously measured it can be determined when resources are about to become scarce, i.e., when the current utilization exceeds currently reserved resources, as based on heuristics, and it is not possible to increase the aggregated reservation for wireless traffic. For open ended reservations, i.e., reservations without an ending time, the bandwidth broker performs admission control between a source and destination. If sufficient resources exist along the path the reservation is granted. In accordance with the present invention, for inter-domain requests, a bandwidth broker aggregates individual requests when making requests with neighboring bandwidth brokers. Accordingly, the increased amount of signaling due to the reservation requests occurs only at the first bandwidth broker.

Through the use of the heuristic load maps the bandwidth broker can balance the trade-off between signaling overhead and link utilization. By using reasonably conservative profiles of the traffic, thus avoiding the large overhead of signaling, a potentially huge number of calls can be saved. In narrow-band links bandwidth can be efficiently utilized by paying the price of managing a relatively small number of flows. For example, for planned events within a limited and predictable mobility scope there may not be enough bandwidth to provide only virtual leased lines as they by definition only span a specific source and destination domain. To support mobility the bandwidth broker should account for multiple sources and destinations. As the resources are utilized between specific end-points a shared tree of virtual leased lines can be built between the end-point and thus provisioning only occurs at the edges of the network.

Service Brokers

The service broker is a superior network entity which bridges information from a specific geographical location to the network entities that are required for guaranteeing the reserved service. In addition, a service broker can contact other service brokers in order to guarantee a reservation. The service broker essentially acts as an interface between the communication system and the service client. Since most network operators will not share information about the topology of their network, the service client cannot directly contact the bandwidth brokers in these networks. Accordingly, the service broker acts as a gateway for the service client to access the bandwidth brokers in a network. It will be recognized that if a network is arranged to allow a service client to directly contact bandwidth brokers, that the service client need not use a service broker.

Figure 6B:
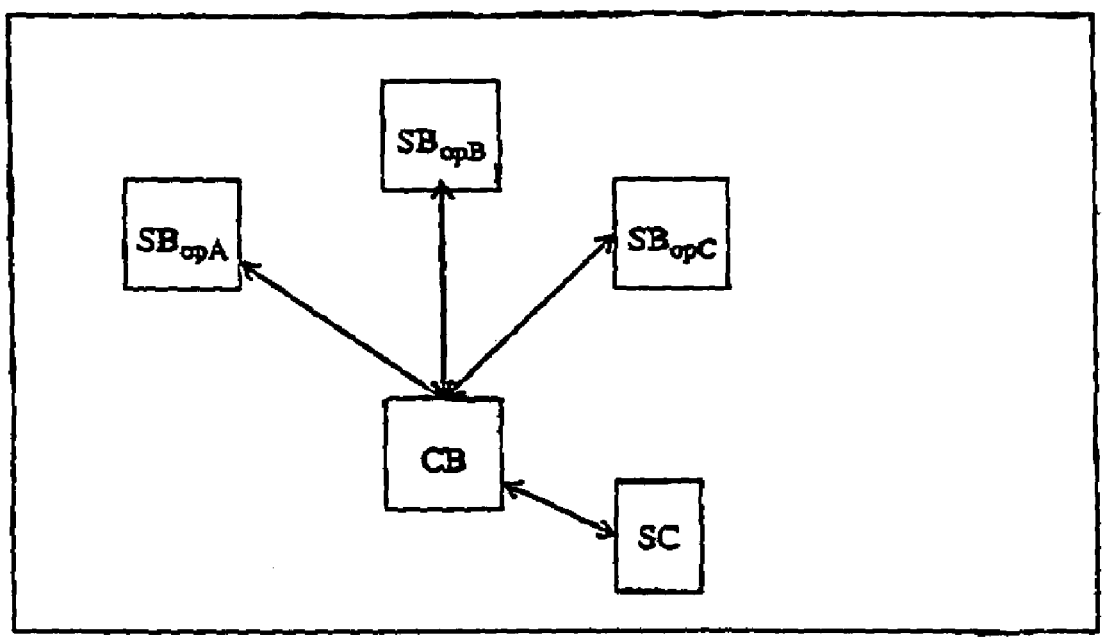
FIG. 6B illustrates resource negotiation using a client broker in accordance with exemplary embodiments of the present invention.
Figure 6A:
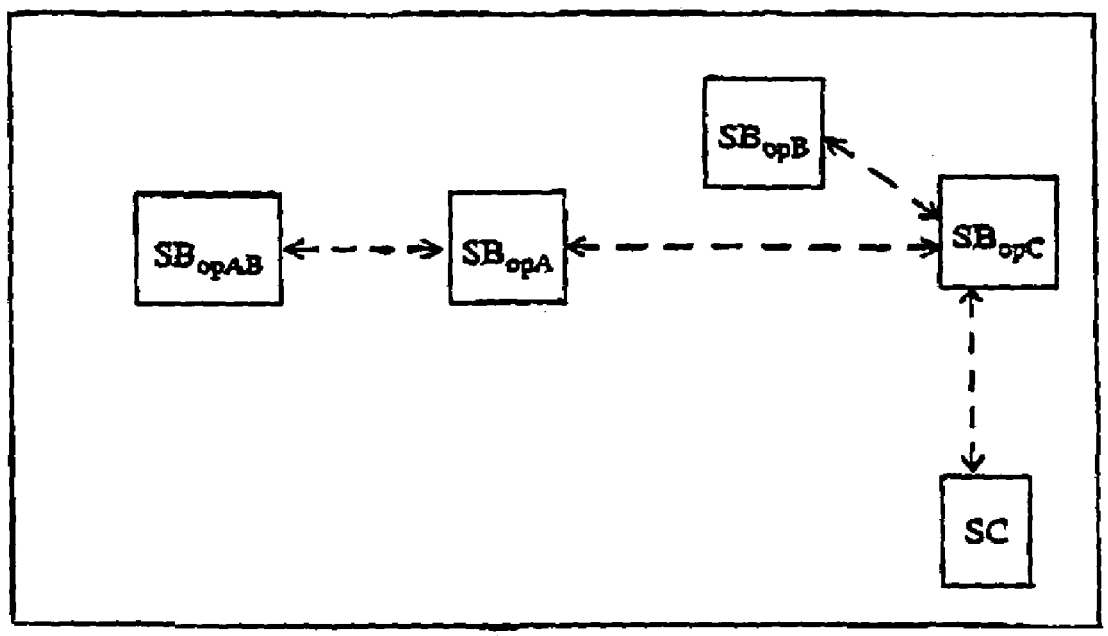
FIG. 6A illustrates resource negotiation using a service broker associated with one network operator to reserve resources in networks operated by other network operators in accordance with exemplary embodiments of the present invention.

FIG. 6A illustrates a system for negotiation of resources from various network operators in accordance with exemplary embodiments of the present invention. The system in FIG. 6A includes a service client and service brokers $SB_{opA}$, $SB_{opB}$, $SB_{opC}$ and $SB_{opAB}$ each associated with different network operators. If the service client is associated with network operator C, the service client will request the service from service broker $SB_{opC}$. If service broker $SB_{opC}$ cannot satisfy the service request, service broker $SB_{opC}$ can contact other service brokers associated with other network operators, i.e., $SB_{opA}$, $SB_{opB}$, and $SB_{opAB}$, to determine whether these networks contain sufficient resources. As illustrated in FIG. 6A, service brokers associated with other network operators, e.g., $SB_{opA}$, can request resources for the service client from other service brokers associated with other network operators, e.g., $SB_{opAB}$.

Client Brokers

A client broker is an entity which is arranged to negotiate service from one or more service brokers on behalf of a service client. FIG. 6B illustrates a system which implements a client broker to reserve resources. The system illustrated in FIG. 6B includes a client broker, a service client and service brokers $SB_{opA}$, $SB_{opB}$ and $Sb_{opC}$, each service broker associated with a different operator. To reserve resources from several possible operators, the service client sends a request to the client broker. The client broker then forwards the request to service brokers $SB_{opA}$, $SB_{opB}$ and $Sb_{opC}$ which are respectively associated with network operators A, B and C. Depending upon the answer received from the various service brokers, the service client will reserve resources in one of the networks. The decision of which network operator to select for the reserved resources include the network operator's ability to provide the requested service and the cost associated with the resources provided by the various network operators.

Geographic Domain Server

Figure 7:
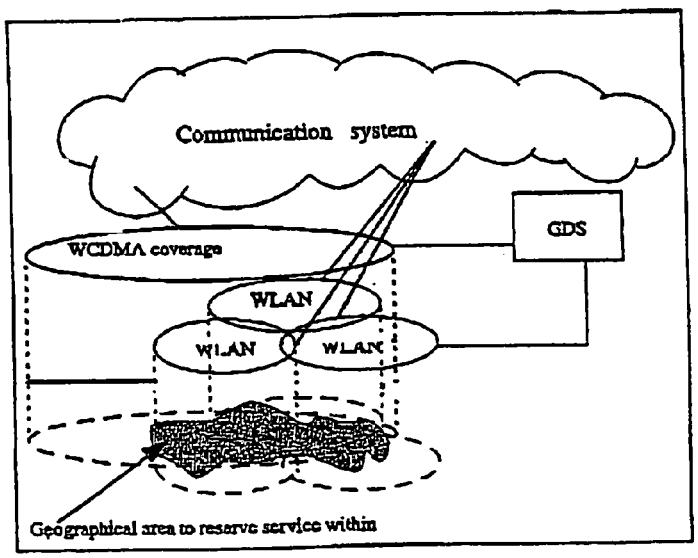
FIG. 7 illustrates a communication system with a wide area wireless network which overlaps a plurality of local area networks and an associated geographical domain server in accordance with exemplary embodiments of the present invention.

FIG. 7 illustrates a communication system with a wide area wireless network which overlaps a plurality of local area networks and an associated geographical domain server in accordance with exemplary embodiments of the present invention. The communication system of FIG. 7 includes a WCDMA wide area wireless network which overlaps three WLAN local area wireless networks. As discussed previously, since wireless terminals do not have a fixed location within the network a reservation system needs to determine the geographical location of the wireless terminals. In accordance with exemplary embodiments of the present invention a geographical domain server is used for mapping specified geographical locations, e.g., longitude and latitude, to a set of applicable wireless access networks. Specifically, a set of geographical domain servers are hierarchically organized, with respect to geography, to provide a directory service to the service brokers. This hierarchical organization is similar to the domain name server (DNS) system used for implementing the logical naming hierarchy of the Internet.

Figure 8:
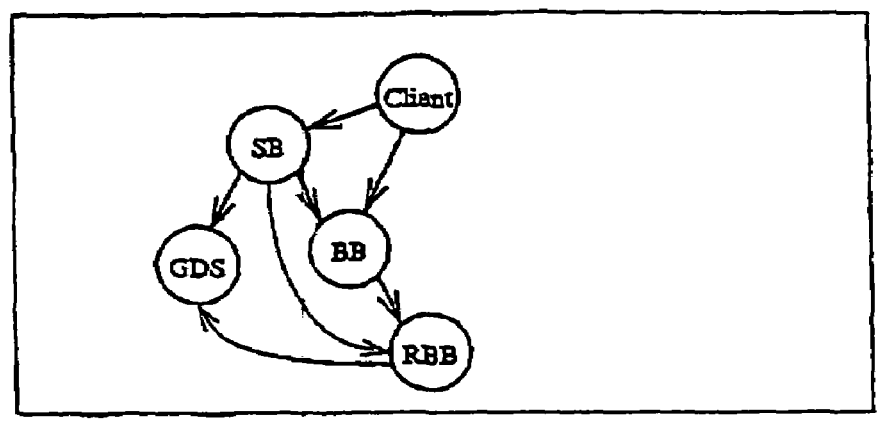
FIG. 8 illustrates the interaction between the client, the service broker, the bandwidth broker and the radio bearer broker in accordance with the present invention.

FIG. 8 illustrates the interaction between the client, the service broker, the bandwidth broker and the radio bearer broker in accordance with the present invention. If the service client is making a reservation between a known pair of IP address prefixes, the service client can contact the bandwidth broker directly to make the reservation. In accordance with this scenario the parameter set for sending admission requests to the bandwidth broker is targeted towards the wired Internet. However, this parameter set may not be sufficient if there are wireless hops managed by radio bearer brokers along the reserved path. To address this situation the bandwidth broker can use a limited parameter set for contacting radio bearer brokers. In view of this situation, a client directly contacting a bandwidth broker is most suitable for clients with wired access and/or for setting up virtual leased lines and private networks through the Internet.

For reservations between geographical locations where the IP addresses are unknown and/or to obtain wireless access with specific quality of service the client should make the reservations by directly contacting the service broker. The service broker will then determine a suitable access network by querying a geographical domain server and then contacting radio bearer brokers and bandwidth brokers to setup the end-to-end reservation between the geographic locations.

Figure 9:
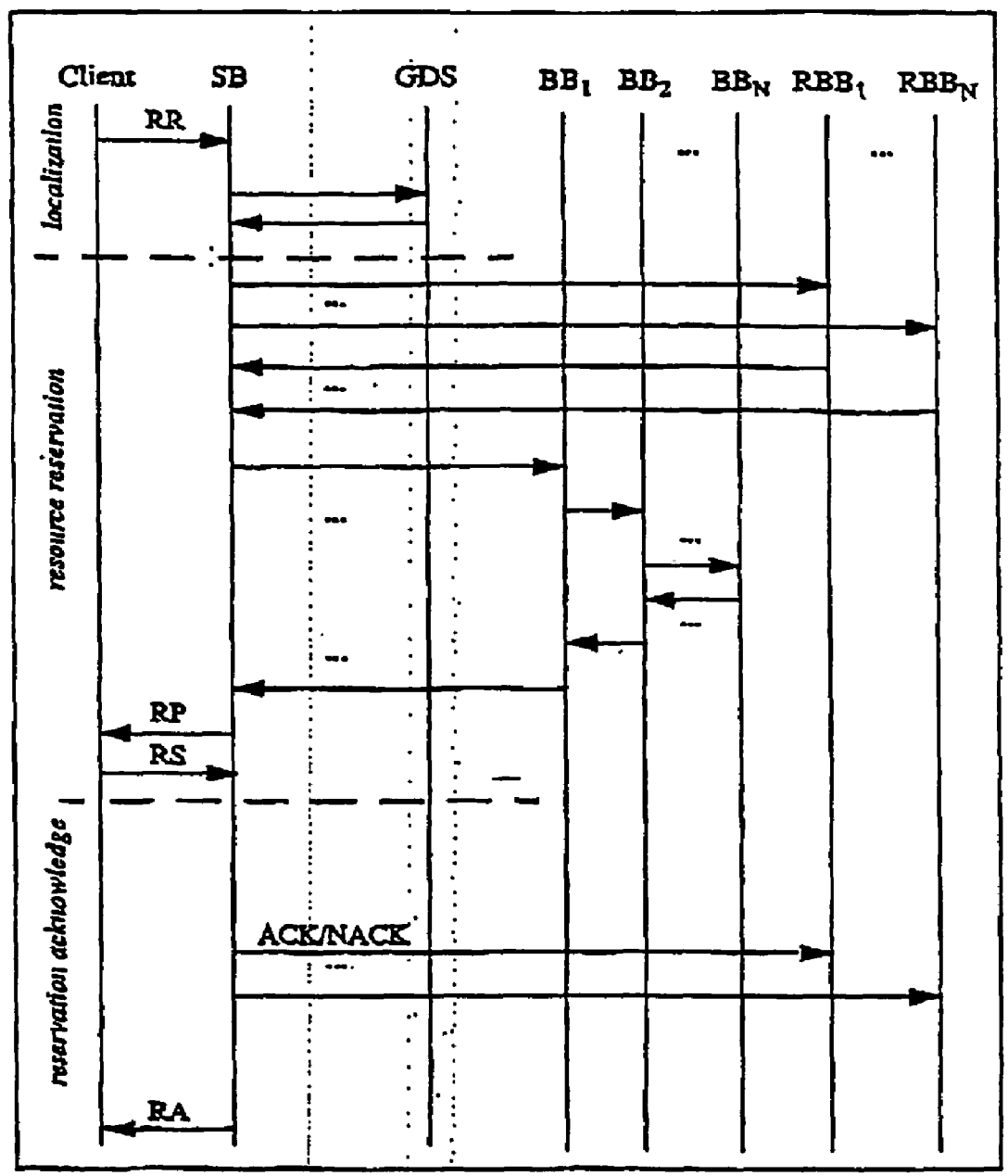
FIG. 9 illustrates the signaling for a reservation in accordance with exemplary embodiments of the present invention.

FIG. 9 illustrates the signaling for a reservation in accordance with exemplary embodiments of the present invention. Initially, the service client sends a reservation request to the service broker. The reservation request includes the service client capabilities, i.e., supported wireless technologies, services and requirements for the services, the geographical area over which the service is required, the duration of the reservation, the time span over which the reservation can be made, the mobility of the service client and whether the reservation is a hard reservation or a soft reservation.

Hard reservation is made to guarantee that the reserved service is available, while a soft reservation is made to provide a high probability that the service will be available. It will be recognized that the use of hard and soft reservations is to avoid reserving too much bandwidth. For example, if a service client is highly mobile, a hard reservation over a large geographic area will result in unused bandwidth in areas where the service client is not located during the reservation period. However, if a system operator's policy is to provide guaranteed service regardless of the cost, the system will maintain the hard reservation over the large geographical area until the communication begins. Once the communication begins the hard reservation constraint can be removed.

Hard and soft reservations can also be used in areas where there is overlapping coverage between different access technologies. For example, referring again to FIG. 7, a hard reservation can be made in one of the WLAN networks with a soft reservation in the overlapping WCDMA network. Accordingly, if the load on the preferred access technology, i.e., WLAN, is too large the reservation can be switched to the secondary access technology, i.e., WCDMA, to maintain the reserved service.

Referring again to FIG. 9, after receiving the reservation request from the service client, the service broker contacts the geographic domain server to determine where the resources for the reserved service are located. The geographic domain server provides the service broker with the geographic location corresponding to the reserved services. Based upon the provided geographic information the service broker initially contacts radio bearer brokers to determine whether there is sufficient bandwidth in the wireless networks to accommodate the reservation request. The service broker then contacts various bandwidth brokers to determine whether there is sufficient bandwidth in the Internet backbone to accommodate the reservation request.

Based upon the responses received from the various bandwidth brokers and radio bearer brokers the service broker provides a reservation proposals response (RP) containing an indication of the services that can be reserved, the access technologies available and the cost per service for different starting times within the time span selected by the service client. The service client then sends a reservation selection (RS) informing the service broker of the services selected by the service client. The service broker then reserves the services and sends a reservation acknowledgment to the service client to confirm the reservation.

It will be recognized that the service client need not necessarily provide geographical information for the reservation in terms of latitude and longitude. For example, the organizers of a conference could define the required service area for people attending the conference. Accordingly, a user who desires to reserve in advance a certain service can simply provide the area information provided by the organizers of the conference. Similarly, managers of an airport could define the area to be served for the airport. If a service reservation were made in a taxi on the way to an airport the service client need only know the airport name to make the reservation.

Although the present invention has been described above in connection with reserving resources for a service client, it will be recognized that by reserving resources for a service client, resources are reserved for the other party to the communication session. Accordingly, if the other party is mobile, the position of the other party at the reserved time will need to be determined for the reservation. In other words, the reservation should account for the other party in the same manner as that described above in connection with reserving resources for a service client.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for managing resource services between terminals in communication networks, the method comprising the steps of:
   sending a resource reservation request, for service between a service client terminal and one or more terminals, to a service broker (SB) in an access network, wherein each terminal is a wireless or a wired terminal and each terminal is a fixed or a mobile terminal;
   upon receiving the resource reservation request in advance of, or at the time of, the need for the resource, the service broker providing wireless service for a specific geographic area by identifying the most suitable access technology out of all possible available access technologies to provide the requested service;
   responsive to the reservation request, the SB setting up reservations for the requested service by
      communicating with a geographic domain server (GDS) to determine the geographic location corresponding to the requested resource service;
      communicating with a radio bearer broker (RBB) coupled to the access network associated with each of the one or more terminals to determine whether there is sufficient resources available and to gain admission to each associated access network;
      communicating with a bandwidth broker (BB) to determine whether there are sufficient resources for the requested service in the BB's muting domain, and to make an advance resource reservation or an immediate reservation; and
   allocating the requested resources to the service client terminal and the one or more terminals.

2. The method of claim 1, wherein responsive to a request for specific quality of service (QoS) the service broker
   determining a suitable access network by querying the geographic domain server, the one or more radio bearer brokers and the bandwidth broker to set up the reservation.

3. The method of claim 1, wherein the service broker acts as a gateway for the service client terminal to entities in the communication networks, comprising the GDS, the RBB and the BB, that are utilized for guaranteeing the requested resource reservation.

4. The method of claim 1, wherein bandwidth brokers are implemented in the Internet backbone.

5. The method of claim 1, wherein the radio bearer broker is adapted for handling service requirements of various types of traffic communicated over a radio access interface in the access network.

6. The method of claim 1, wherein the access network is a wired network.

7. The method of claim 1, wherein the access network is a wireless network.

8. The method of claim 1, wherein a network node, or nodes, each implement a radio bearer in each access network according to the needs of the specific access network.

9. The method of claim 1, wherein the reservation request is sent to the service broker by a terminal other than the service client terminal and
   the reservation request is for a geographic location that is the same as the geographic location of the service client terminal or is different from the location of the service client terminal.

10. The method of claim 1, further comprising the steps of:
- sending a guaranteed reservation request via a first network and
- sending a non-guaranteed reservation request via an overlapping network having a different access technology.

11. The method of claim 10, further comprising the step of:
- determining that the guaranteed reservation is denied in the first network and utilizing the reservation request in the overlapping network.

12. The method of claim 1, wherein the service broker associated with a first network operator is adapted to contact a service broker associated with another network operator to determine if resources are available to enable the resource reservation request.

13. An apparatus for managing resource services between terminals in communication networks, the apparatus comprising:
- a service broker (SB) in an access network adapted for receiving a resource reservation request for service between a service client terminal and one or more terminals, wherein each terminal is a wireless or a wired terminal and each terminal is a fixed or a mobile terminal;
- the service broker, upon receiving the resource reservation request in advance of, or at the time of, the need for the resource, providing wireless service for a specific geographic area by identifying the most suitable access technology out of all possible available access technologies to provide the requested service and setting up reservations for the requested service by
    - communicating with a geographic domain server (GDS) to determine the geographic location corresponding to the requested resource service;
    - communicating with a radio bearer broker (RBB) coupled to the access network associated with each of the one or more terminals to determine whether there is sufficient resources available and to gain admission to each associated access network;
    - communicating with a bandwidth broker (BB) to determine whether there are sufficient resources for the requested service in the BB's routing domain, and to make an advance resource reservation or an immediate reservation; and
- the service broker adapted to allocate the requested resources to the service client terminal and the one or more terminals.

14. The apparatus of claim 13, wherein the SB is further adapted for choosing a suitable access network having a requested quality of service according to information received from the geographic domain server, the one or more radio bearer brokers and the bandwidth broker.

15. The apparatus of claim 14, wherein the service broker acts as a gateway for the service client terminal to entities in the communication networks, comprising the GDS, the RBB and the BB, that are utilized for guaranteeing the requested resource reservation.

16. The apparatus of claim 14, wherein the bandwidth broker is implemented in the Internet backbone and operates in an heuristic mode for advance resource reservations.

17. The apparatus of claim 14 wherein the radio bearer broker is adapted to handle service requirements of various types of traffic communicated over a radio access interface in the access network.

18. The apparatus of claim 14, wherein the access network is a wired network.

19. The apparatus of claim 14, wherein the access network is a wireless network.

20. The apparatus of claim 14, wherein the radio bearer broker is implemented in a network node or nodes in each access network according to the needs of the specific access network.

21. The apparatus of claim 14, wherein the service broker is further adapted to handle a resource reservation from a terminal other than the service client terminal, wherein the reservation request is for a geographic location that is the same as the geographic location of the service client or is different from the location of the service client.

22. The apparatus of claim 14, further comprising:
- means for sending a guaranteed reservation request via a first network and for sending a non-guaranteed reservation request via an overlapping network having a different access technology.

23. The apparatus of claim 22, further comprising the step of
- means for utilizing the non-guaranteed reservation request in the overlapping network upon determination that the guaranteed reservation is denied in the first network.

24. The apparatus of claim 13, wherein the service broker associated with a first network operator is adapted to contact a service broker associated with another network operator to determine if resources are available in the another network to enable the resource reservation request.

25. The method of claim 1, wherein the access network is arranged to allow the service client to directly contact bandwidth brokers and the service client does not contact the service broker.

26. The apparatus of claim 13, wherein the access network is arranged to allow the service client to directly contact bandwidth brokers and the service client does not contact the service broker.

* * * * *

UNITED STATES PATENT AND TRADEMARK OFFICE
CERTIFICATE OF CORRECTION

| | | |
|---|---|---|
| PATENT NO. | : 7,054,938 B2 | Page 1 of 1 |
| APPLICATION NO. | : 09/778004 | |
| DATED | : May 30, 2006 | |
| INVENTOR(S) | : Sundqvist et al. | |

It is certified that error appears in the above-identified patent and that said Letters Patent is hereby corrected as shown below:

In Fig. 1, Sheet 1 of 5, delete Tag "210" and insert -- 110 --, therefor.

In Column 12, Line 32, in Claim 1, delete "muting" and insert -- routing --, therefor.

Signed and Sealed this

Eleventh Day of December, 2007

JON W. DUDAS
*Director of the United States Patent and Trademark Office*